No. 12,718. REISSUED NOV. 12, 1907.

E. A. BERN.

CAP FOR SHEET PILING.

APPLICATION FILED AUG. 7, 1907.

Witnesses.

Geo. E. Gaylord.

John Enders.

Inventor,

Edward A. Bern,

By Sheridan & Wilkinson,

Attys.

UNITED STATES PATENT OFFICE.

EDWARD A. BERN, OF CHICAGO, ILLINOIS.

CAP FOR SHEET-PILING.

No. 12,718. Specification of Reissued Letters Patent. Reissued Nov. 12, 1907.

Original No. 834,866, dated October 30, 1906, Serial No. 291,633. Application for reissue filed August 7, 1907. Serial No. 387,569.

*To all whom it may concern:*

Be it known that I, EDWARD A. BERN, a citizen of the United States, residing at Chicago, in the county of Cook and State of Illinois, have invented certain new and useful Improvements in Caps for Sheet-Piling, of which the following is a specification.

This invention relates to improvements in caps for metal sheet piling, and has for its object to provide a suitable cap to be used in driving a piling to keep the piles in alinement and to protect the ends of the piles from injury.

The invention consists in the construction described in the following specification and claims.

Figure 1:
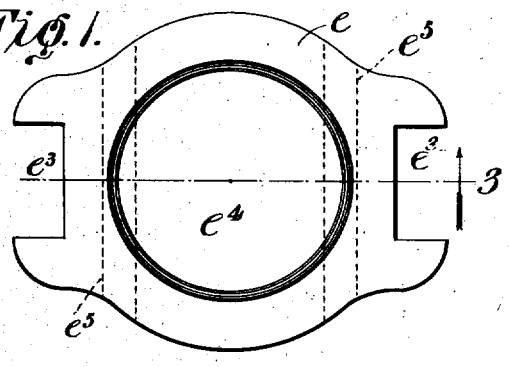
Figure 2:
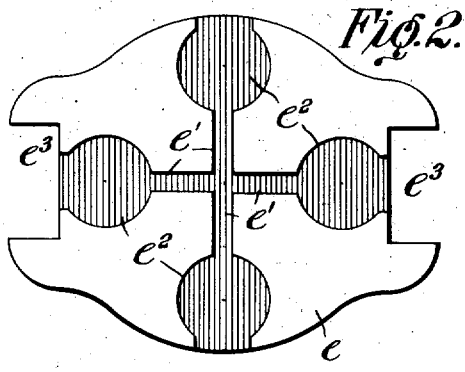
Figure 3:
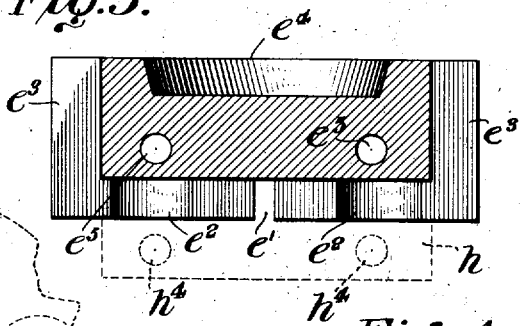
Figure 4:
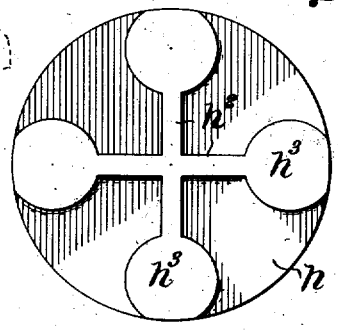
Figure 5:
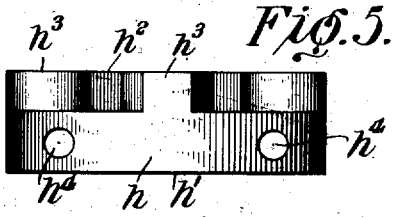
Figure 6:
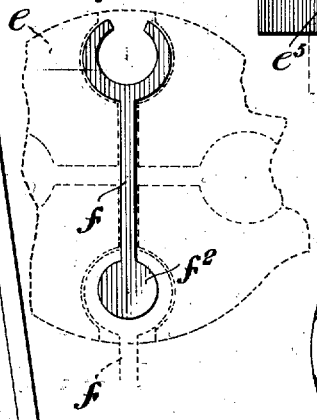
Figure 7:
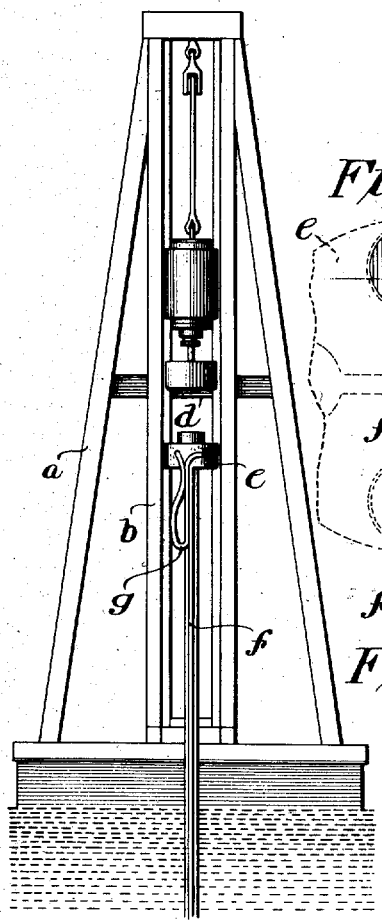

In the drawings—Figure 1 is a top plan view of my improved cap. Fig. 2 is a bottom plan view thereof. Fig. 3 is a transverse section on the line 3 of Fig. 1. Fig. 4 is a top plan view of a portion of the cap. Fig. 5 is a side elevation of the cap shown in Fig. 4. Fig. 6 is a plan view showing two sections of the sheet piling with the cap in position for driving the same, the cap and the driven pile being indicated in dotted lines. Fig. 7 is an end elevation of a pile driver, showing the method of using the cap.

As is well-known, sheet metal piling is made in sections composed usually of a web portion provided at its ends with interlocking devices. Such a pile is shown in Figs. 6 and 7. In the specific form shown in Fig. 6, $f$ indicates the web portion of the pile, $f'$ a recessed end portion, and $f^2$ a slotted end adapted to enter the recessed portion of the adjacent pile, as indicated in this figure. These piles are used in the construction of sea-walls, docks, coffer-dams, bridge-pier foundations, and in work of similar character, and it is desirable in driving them to provide some means for preventing injury to the ends of the piles from the force of the blow delivered thereon by the hammer of the pile-driver and also to provide some means for holding the pile being driven in alinement with the adjacent driven pile. I provide, therefore, a follower-cap $e$, shown particularly in Figs. 1, 2 and 3. This cap is composed of a block of suitable material having guide-recesses $e^3$ to engage the standard $b$ of the pile-driver, and this block is provided on its under side with recesses $e'$, having ends $e^2$, the recesses $e'$, $e^2$ being of a shape corresponding with the transverse section of the pile. The block is provided on its opposite face with a recess $e^4$ adapted to receive a wooden block or a block of some elastic material which will absorb some of the shock of the blow and prevent injury to the cap. When in use the cap is placed upon the end of the pile to be driven.

As indicated in dotted lines in Fig. 6, it will be observed that the pile, with its interlocking members, rests in the correspondingly shaped recess of the follower-cap. As the pile is driven down by the blows of the hammer $d$ the recessed end of the next adjacent driven pile will enter the recess of the block which contains the solid end of the pile being driven. This will insure the ends of the adjacent piles being driven in exact alinement.

It is necessary to provide means whereby the driving cap may be utilized either when the pile-driver is located at the side or the end of the sheet piling wall, the particular position of the pile-driver relative to the wall of sheet piling depending upon the character of the work, whether upon land or water, and upon whether the pile-driver itself is mounted upon a floating structure or upon land. In order to accomplish this result, I provide the driving cap with two sockets, one at right angles to the other. By means of this construction the necessity of employing a plurality of differently formed driving caps, or of changing the position of the pile-driver, is avoided.

It will be observed that the block $e$ has recesses on each diameter. When driving corner-piles, it is desirable to use a block having a plain driving face. I provide, therefore, a block $h$ having a plain lower face $h'$ and an upper face provided with projections $h^2$, $h^3$ respectively corresponding in shape to the recesses $e'$, $e^2$ of the upper block. This lower block being placed on the corner-piles, the upper block is placed thereon with its recesses engaging the projections and the corner-pile driven, as will be readily understood. As the plain face of the lower block wears away, it is desirable to provide for some adjustment thereof, and this is one of the functions of the crossed recesses and projections, for, as will be apparent, the lower block may be so placed that either of its ribs or projections may engage with either of the recesses in the upper block. The blocks are provided with passages or perforations $e^5$, $h^4$ through which a rope $g$ may be passed for the purpose of lifting the blocks.

It will be observed that while I have shown the piling and the recesses in the block as having circular projections and recesses the shape of these interlocking parts may be changed without departing from the spirit of my invention.

What I claim is:

1. A cap for sheet-metal piling, comprising a block having recesses on one face on each diameter, each recess corresponding in shape to the transverse section of a pile, and a second block having projections adapted to enter the recesses.

2. A cap for sheet-metal piling, comprising an upper block having recesses on one face corresponding in shape to the transverse section of a pile, and a lower block having a plain face adapted to rest on the pile and provided on its opposite face with projections entering the recesses in the upper block.

3. A cap for sheet-piling, comprising a block having two recesses in one face thereof, said recesses being disposed at an angle to each other and each of said recesses conforming substantially to the cross section of a pile.

4. A cap for sheet piling, comprising a block having guides at its sides, and having two recesses in its lower face, said recesses being disposed at an angle to each other and each of said recesses conforming substantially to the cross section of a pile.

5. A cap for interlocking sheet piling, comprising a block having a recess extending completely across one face thereof, said recess being of such form as to embrace the end of a pile being driven and the interlocking part of the previously driven pile.

EDWARD A. BERN.

Witnesses:
JENNIE MACEDWARD,
LILLIAN KIBBY.